United States Patent [19]

Strobl

[11] Patent Number: 4,983,871
[45] Date of Patent: Jan. 8, 1991

[54] COMMUTATOR WITH BASE ALIGNMENT INTERLOCK

[75] Inventor: Georg Strobl, Hong Kong, Hong Kong

[73] Assignee: Johnson Electric S.A., La Chaux de Fonds, Switzerland

[21] Appl. No.: 388,380

[22] Filed: Aug. 2, 1989

[30] Foreign Application Priority Data

Aug. 4, 1988 [GB] United Kingdom ............... 8818577

[51] Int. Cl.⁵ .................... H02K 13/04; H02K 15/00; H01R 43/06
[52] U.S. Cl. .................................... 310/234; 310/42; 29/597
[58] Field of Search .................. 29/597; 310/42, 43, 310/233, 234, 235, 236

[56] References Cited

U.S. PATENT DOCUMENTS

| 4,469,972 | 9/1984 | Rampignon et al. ............ 310/233 |
| 4,584,498 | 4/1986 | Strobl ................................ 310/236 |

FOREIGN PATENT DOCUMENTS

| 1224823 | 9/1966 | Fed. Rep. of Germany ...... 310/235 |
| 83/03324 | 9/1983 | PCT Int'l Appl. ................... 29/597 |
| 2128818 | 5/1984 | United Kingdom . |
| 2198890 | 6/1988 | United Kingdom ............... 310/233 |
| 2202384 | 9/1988 | United Kingdom . |

Primary Examiner—Steven L. Stephan
Assistant Examiner—D. L. Rebsch
Attorney, Agent, or Firm—Fleit, Jacobson, Cohn, Price, Holman & Stern

[57] ABSTRACT

A commutator comprises a commutator base 10 having segments 12 mounted thereon. Each segment has a terminal 14 adapted to straddle and grip a connector portion 66 of an armature winding, to make electrical contact with the winding. The terminals 14 are supported in housings 50 of a terminal support 48. Fingers 72 on the support 48 engage in recesses 74 in the base 10 to align the support and base before the terminals 14 are inserted into the housings 50.

8 Claims, 4 Drawing Sheets

4,983,871

COMMUTATOR WITH BASE ALIGNMENT INTERLOCK

FIELD OF THE INVENTION

This invention relates to a commutator for an armature of an electric motor.

BACKGROUND OF THE INVENTION

In my British Patent No. 2128818B I describe a connection between an armature winding and a commutator segment which avoids the application of heat to effect the connection and which utilizes the principle of insulation displacement in which a wire having an insulating cover is forced into a slot narrower than the wire diameter to form a clean metal-to-metal contact between the wire and a terminal integral with the commutator segment.

In the aforesaid Patent the commutator segments are mounted on a base which includes a plurality of integral housings for receiving the aforesaid terminals. The commutator segments are attached to the base whilst the base is on the armature shaft.

My published British application No. 2198890 describes a commutator in which the segments are pre-assembled on a base which can then be slid onto the armature shaft. The housings are previously mounted on the shaft, and the armature wire is wound through the housings.

When using commutators with a large number of segments the size of the housings becomes quite small and it can be difficult to slide the terminals into the housings without risk of damage to the terminals or housings.

SUMMARY OF THE INVENTION

A first aspect of the present invention provides an armature for an electric motor, comprising a winding having connector portions, a plurality of commutator segments each having an integral terminal provided with a means defining a slot, said means straddling and gripping a respective connector portion, a commutator base for supporting said commutator segments and a separate terminal support having a plurality of receiving means in which the terminals are located when the support and base are brought together, wherein alignment means is provided for aligning the commutator base circumferentially with respect to the terminal support as they are brought together.

The arrangement may be such that the segments are pre-assembled on the base and the base and support are then brought together, preferably on an armature shaft, the terminals being received in the housings. The slots may be arranged so that the connector portions can then be drawn into the slots during winding of the armature. In a preferred form, the connector portions are first positioned in the housings and the slots arranged to straddle and grip a connector portion as the base and support are brought together.

A second aspect of the invention provides a commutator for an electric motor, comprising a plurality of commutator segments each having an terminal provided with a slot, a terminal support mountable on a shaft of the motor, said support having a plurality of receiving means each for receiving a said terminal, a base separate to said support, said base being mountable on said shaft adjacent the support and being arranged to support said commutator segments, wherein said support and said base are separately mountable on the shaft and alignment means is provided for aligning said base relative to said support in the circumferential direction.

The connector portion may be formed by a part of the armature winding wire or it may be formed by a separate electrically conducting element, the armature winding wire being wound around the element to form an electrical connection with the commutator segment. This may be particularly useful when thin armature wire is being used.

In addition to assisting in aligning the support and base during assembly the alignment means may also serve to secure the base against circumferential movement relative to the support. This will facilitate machining of the commutator segments.

Other, preferred features and advantages of the invention will be apparent from the following description and the accompanying claims.

BRIEF DESCRIPTION OF THE DRAWINGS

The invention will be further described by way of example with reference to the accompanying drawings, in which.

DETAILED DESCRIPTION OF THE PREFERRED EMBODIMENT

Figure 1:
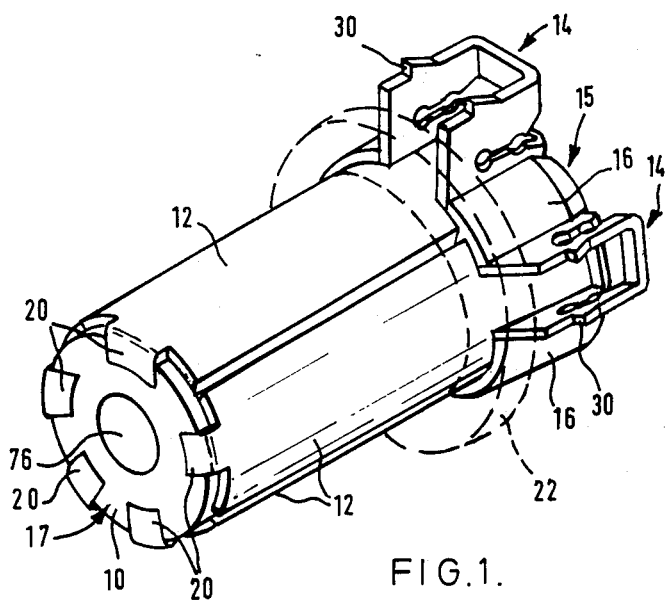
FIG. 1 is a perspective view of one embodiment of a pre-assembled part of a commutator according to the present invention.

Referring firstly to FIG. 1, a commutator base 10 is preferably of thermosetting plastics material, such as a phenolic resin, or of metal coated with an insulating layer of metal oxide, e.g. anodized aluminium, and carries a plurality (as shown five) of copper commutator segments 12, each having an integral terminal 14.

The base 10 is essentially right cylindrical and is provided with five arcuate raised portions 16 at one end 15, the raised portions 16 being equally spaced around the circumference of the base 10 to define recesses therebetween in which the terminals 14 of the commutator segments 12 are located.

The other end 17 of the base 10 is provided with five longitudinal recesses 18 (FIG. 5) which are cut away at their outer ends to meet the cylindrical external surface of the base 10. These recesses 18 receive lugs 20 provided at the end of the segments 12 remote from the terminals 14 to assist in securing the segments to the base. As an alternative to the lugs 20 and recesses 18 the segments 12 could be provided with integral formations which fit over respective posts integral with said other end of the base.

A ring 22 is provided as a tight fit on the commutator segments 12 and is pushed down against the raised portions 16. This ring 22 further assists in securing the segments 12 to the base 10. This ring 22 could be snipped off after the commutator is connected to an armature of a motor or if made of resistive or electrically insulating material could be left on the commutator.

In a preferred embodiment, the segments 12 are bonded to the base 10. This would have the effect of rendering the mounted segments more machinable and the ring 22 may be dispensed with.

Figure 2:
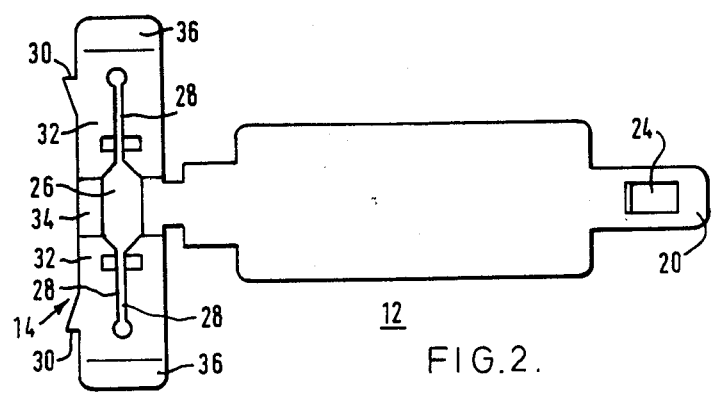
FIG. 2 is a plan view of a commutator segment.

A combined commutator segment 12 with integral terminal 14 is illustrated in FIG. 2 in the form of a blank. The lug 22 which is of reduced width is provided at the front end of the segment 12 and the lug 22 has a dimple 24 to restrain the lug 22 within the recess 18 (FIG. 1). At its rear end, the commutator segment 12 is connected to the terminal 14. The terminal 14 is rectangular with its minor axis coincident with the longitudinal axis of the commutator segment 12. The terminal 14 has a central cut out portion 26 which is symmetrical with respect to both the major and minor axes of the terminal 14. The cutout 26 reduces from its largest width at the center of the terminal to two key hole shaped cutout portions 28 which terminate either end of the cutout 26. A triangular barb 30 is provided on either side of the minor axis of the terminal 14 along the edge furthest from the commutator segment 12.

As can be seen from FIG. 1, the commutator segment 12 is of arcuate form which conforms to the external radius of the cylindrical base 10. The lug 20 extends below and back along the length of the commutator segment 12 with the tag 14 projecting below the lug 20. Terminal 14 is bent upright from the commutator segment 12 and arms 32 of the terminal 14, which include the respective key hole shaped portions 28, are bent at 90 degrees to the central portion 34 of the terminal. The arms 32 therefore extend parallel to each other and to the longitudinal axis of the commutator segment 12, and forward along the length thereof. The free ends 36 of the terminal 14 may be bent so as to be inclined towards each other when the arms 32 have been bent parallel to each other.

Figure 3:
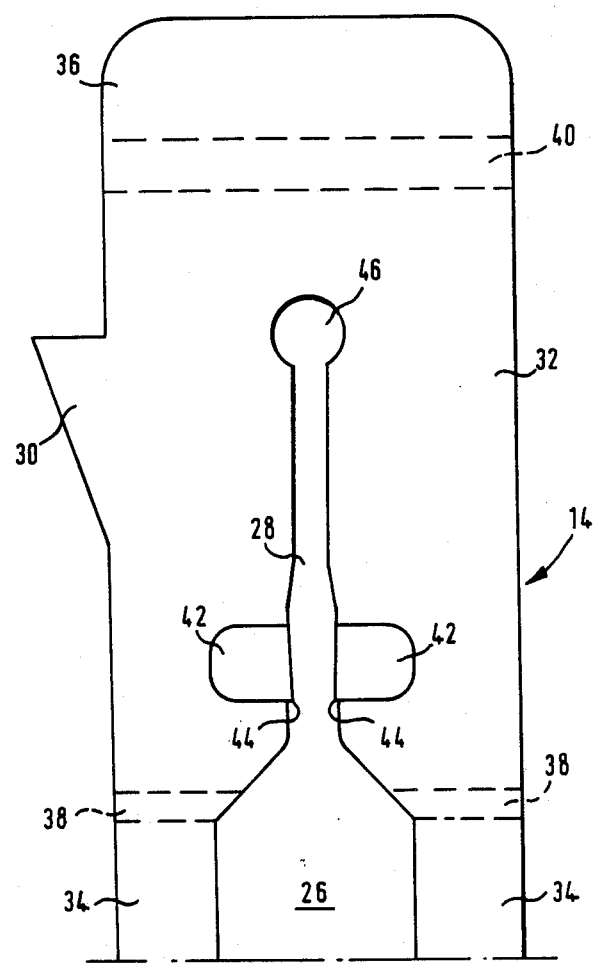
FIG. 3 is an enlarged view of one portion of the segment shown in FIG. 2.

FIG. 3 shows one half of the terminal 14 of the FIG. 2, on an enlarged scale. Areas 38 are shown in which bending occurs between the central portion 34 and the arm 32. Area 40 is also indicated in which bending between the arm 32 and the extreme end portion 36 occurs However, the main purpose of FIG. 3 is to illustrate the detailed structure of the key hole shaped cutout portion 28. It is this feature which ensures electrical contact with the connector portion of the armature winding. The reduction in size from the center of the cutout 26 to the start of the key hole portion 28 provides a funnel for guiding the arm 32 onto a portion of the winding. A short distance into the key hole portion 28 there are located two cutters 42 which have sharp edges 44 projecting into the cutout 28. The cutters 42 are formed from the arm 32 but are partially severed therefrom such that the sharp edges 44 are resiliently urged into the cutout 28. Along the cutout 28, behind the cutters 42, there is a further small reduction in width. Circular end 46 of cutout 28 ensures that the edges of the cutout 28 have a certain resilience to separation by the winding portion.

Figure 4:
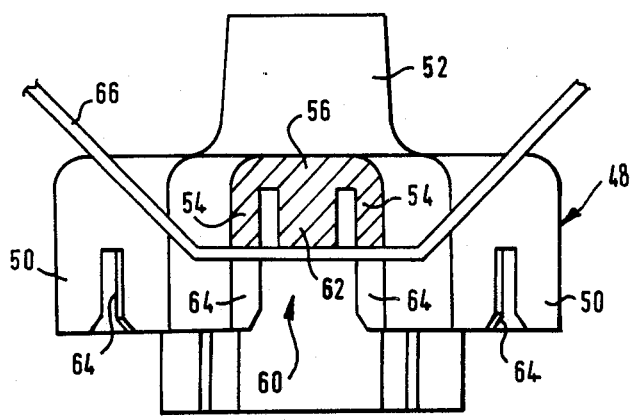
FIG. 4 is a plan view of a terminal support, the support being shown partially sectioned to illustrate the configuration of one of its terminal housings.
Figure 5:
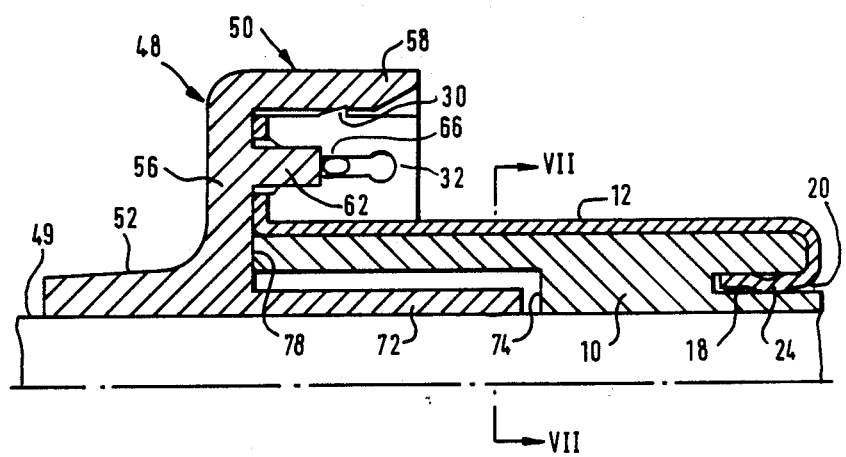
FIG. 5 is a vertical sectional view of the assembly of FIG. 1 connected to the support of FIG. 4.
Figure 6:
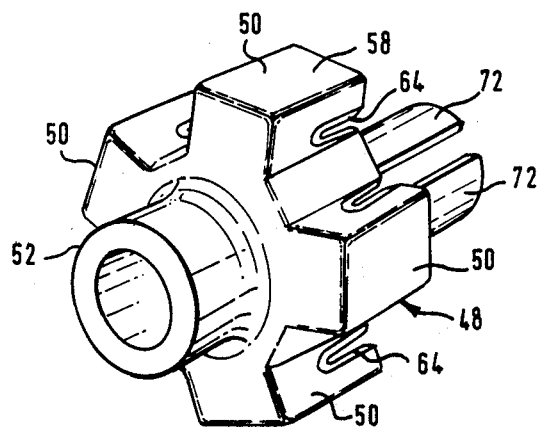
FIG. 6 is a perspective view of the terminal support of FIG. 4.
Figure 7:
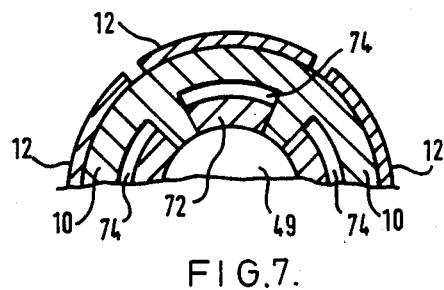
FIG. 7 is a cross-section along the line VII-VII of FIG. 5.

FIGS. 4 and 6 show a terminal support which cooperates with the segment-base assembly of FIG. 1, the assembled commutator being shown in cross-section in FIGS. 5 and 7. The support is in the form of a body 48 of molded thermoplastics material, e.g. thermosoftening nylon. The body 48 is mounted fast on the shaft 49 of an armature of an electric motor and comprises five housings 50 and a sleeve portion 52 which serves to space the housings 50 from the base of the armature stack (not shown).

The housings 50 are equally spaced around the circumference of the body 48. Each of the housings 50 is used in effecting connection between a respective portion of the armature winding and one of terminals 14 of the commutator segments 12.

One of the housings 50 is shown in section in FIG. 4. The housing has side walls 54, an end wall 56 and a cover 58. The end wall 56 is adjacent the sleeve portion 52 and an opening 60 faces away from the sleeve portion 52. The side walls are parallel with the longitudinal axis of the body 48.

A boss 62 projects centrally from the internal surface of the end wall 56 and extends within the housing 50 for approximately half the length of the side walls 54. The boss 62 extends parallel with the longitudinal axis of the body 48 and is only connected to the body 48 by the end wall 56. Each side wall 54 of the housing 50 has a slot 64 which extends parallel to the longitudinal axis of the body 48, from the open end of the housing 50 for a length which terminates at the level of the free end of the boss 62. A connector portion 66 of the armature winding is passed through the slots 64 of one of the housings 50 and the portion 66 rests on the end of the boss 62. The external surfaces of the side walls 54 are bevelled so as to facilitate entry of the winding portion 66 into the slots 64.

As seen by reference to FIGS. 5 and 7, the terminal support has five evenly spaced fingers 72 which extend along the shaft 49, underneath the center line of each housing 50. The fingers extend beyond the housings in the axial direction.

The base 10 is provided with five recesses 74 in its inner circumferential wall 76. The recesses 74 are evenly spaced and positioned under the center line of each segment 12. The recesses extend from the end wall 78 at the end 15 of the base 10. The recesses 74 are deeper in the radial direction than the fingers 72 and longer than the fingers.

As shown, recesses 74 are a snug fit in the circumferential direction about the fingers 74.

The armature may be assembled as follows:

The body 48 is first placed on the armature shaft with the sleeve portion 52 against the base of the lamination stack. The lead wire of the armature winding is inserted into the housing 50 by laying the end of the wire 66 in the slots 64 provided in the side walls 54 of the housing.

The wire 66 is drawn back into the housing 50 until it rests against the boss 62. From this start, the first armature coil is wound. At the end of the first coil winding the armature is indexed and the wire 66 is laid in the same manner in the next housing 50 without breaking the continuity of the wire 66.

This process is repeated until all coils have been wound and the tail end of the winding is then laid in the slots 64 of the first housing 50 and pushed back until it is adjacent to the lead end which was placed against the boss 62 at the beginning of the winding operation. The wire 66 is then cut and the armature removed from the winding machine.

The body 48 now has a winding portion 66 comprising insulated wire lying in each of the housings 50. Each of the winding portions 66 is under tension and is pulled tight against the respective boss 62.

The commutator which has been pre-assembled, that is the segments 12 have been mounted on the base 10, is then slid along the armature shaft. As the base 10 is slid along the shaft 49 it will encounter the fingers 72 of the body 48 before the terminals 14 enter the housings 50. The base 10 must then be rotated circumferentially to align the recesses 74 with the fingers 72, and the terminals 14 are thus aligned with the housings 50. The base is then pushed further on the shaft over the finger 72. As the terminals 14 approach the winding portions 32 held in the housings 50, the slots provided by cutouts 28 move over the wires 66. The sharp edges 44 of the cutters 42 sever the insulation on the wires 66 which are deformed as the slots, formed by cutouts 28, move over the wires 66. Intimate metal-to-metal contact is thereby provided between the wires 66 and the terminals 14.

The ears 16 enter into the body 48 between the housings 50. The barbs 30 grip the cover 58 of the housing 50 and therefore retain the terminal 14 within the housing 50.

The fingers 72 may be tapered at the ends and or the recesses 74 widened at their open end to facilitate guidance of the recesses over the fingers 72.

It will be appreciated that only a single finger and one, or more, recesses need be provided. However it is desirable to ensure that the commutator is evenly balanced about the shaft 49. Accordingly the fingers and recesses are preferably evenly distributed about the shaft.

For a commutator with 3 or 5 bars, that is segments, five fingers and five recesses are provided. For 8 or 12 bars, four recesses and two fingers are preferably provided. For 10 bars, five fingers and five recesses are provided.

By providing recesses in the base the quantity of material used in the base can be reduced, thus saving on production costs.

The above embodiments are given by way of example only and various modifications will be apparent to persons skilled in the art without departing from the scope of the invention defined by the appended claims. For example, the commutator segments could be secured to the commutator base solely by bonding or by molding the base in a mold containing the commutator segments. The terminals 14 may be designed with only one arm 32 or may have more than two arms 32. Instead of the barrel commutator shown, the commutator may be a face commutator with the commutator segments arranged in a single plane perpendicular to the axis of the armature.

Furthermore, the connection portions of the winding may be pre-stripped of insulation, thus avoiding the need to provide cutters 42.

This invention is applicable particularly but not exclusively to a commutator of a fractional horsepower electric motor.

What is claimed is:

1. An armature for an electric motor, comprising a winding having connector portions, a plurality of commutator segments each having an integral terminal provided with means defining a slot, said means straddling and gripping a respective connector portion, a commutator base for supporting said segments and a separate terminal support having a plurality of receiving housings in which the terminals are located when the support and base are brought together, wherein alignment means is provided for aligning the commutator base circumferentially with respect to the terminal support as they are brought together, wherein the alignment means causes the terminal support and commutator base to be aligned before the terminals are received in the housings.

2. An armature as claimed in claim 1, wherein the alignment means comprises a finger and recess means defining a recess, the finger being received by said recess means when the terminal support and the commutator base are aligned.

3. An armature as claimed in claim 2, wherein the finger is provided on the terminal support and the means defining the recess is provided on the commutator base.

4. An armature as claimed in claim 2, wherein the finger extends along a shaft of the armature.

5. An armature as claimed in claim 2, wherein a plurality of fingers is provided, said fingers being evenly spaced in a circumferential direction.

6. An armature as claimed in claim 5, wherein the number of recess defining means is greater than the number of fingers.

7. A commutator for an electric motor, comprising a commutator base, a plurality of commutator segments mounted on the commutator base, the segments each having a terminal for straddling and gripping a connector portion of an armature winding for making an electrical connection therewith, and a terminal support comprising a plurality of receiving housings each for receiving a said connector portion and a respective terminal, wherein alignment means is provided for aligning the base relative to the support as the base and support are brought together to locate the terminals in the housings, wherein the alignment means causes the terminal support and commutator base to be aligned before the terminals are received in the housings.

8. An armature for an electric motor, including a commutator as claimed in claim 7.

* * * * *